United States Defensive Publication [19] (H) [11] T959,007

Sanders [43] June 7, 1977

[54] COATING COMPOSITIONS

[76] Inventor: Robert R. Sanders, 4526 Ronald Drive, Kingsport, Tenn. 37664

[21] Appl. No.: 726,902

[22] Filed: Sept. 27, 1976

[51] Int. Cl.[2] ..... C08L 1/14

[52] U.S. Cl. ..... 260/16; 428/481

[57] ABSTRACT

Compositions comprising an organic cellulose ester, an oil-modified alkyd resin, and a solvent blend useful for coating substrates such as wood for protection and appearance are disclosed. The solvent blend contains a component which is a solvent for the organic cellulose ester and a component which is a solvent for the oil-modified alkyd resin. The solvents are chosen from aromatic hydrocarbons, alcohols, aliphatic hydrocarbons, esters and ketones. The solvents and the quantities thereof are chosen using their evaporation rates as guidelines, such that the evaporation time of the solvent component for the organic cellulose ester and the evaporation time for the oil-modified alkyd resin are about equal. It is found that selection of solvents on this basis eliminates or significantly decreases haze and in most cases improves other physical properties in film of coating thickness formed from these compositions.

8 Claims, No Sheets Drawing,

30 Pages Specification

The file of this unexamined application may be inspected and copies thereof may be purchased (849 O.G. 1221, Apr. 9, 1968).